(12) United States Patent
Bruestle et al.

(10) Patent No.: US 8,186,739 B2
(45) Date of Patent: May 29, 2012

(54) TOPPER LIFT SYSTEM AND METHOD

(75) Inventors: Tod Allen Bruestle, Prior Lake, MN (US); Donald T. Borchert, Eagan, MN (US)

(73) Assignee: Topper EZ Lift, Mendota, MN (US)

( * ) Notice: Subject to any disclaimer, the term of this patent is extended or adjusted under 35 U.S.C. 154(b) by 98 days.

(21) Appl. No.: 12/830,694

(22) Filed: Jul. 6, 2010

(65) Prior Publication Data

US 2011/0001333 A1    Jan. 6, 2011

Related U.S. Application Data

(60) Provisional application No. 61/270,177, filed on Jul. 6, 2009.

(51) Int. Cl.
*B60P 7/02* (2006.01)
(52) U.S. Cl. ............... 296/100.02; 296/100.01
(58) Field of Classification Search ............ 296/100.02, 296/100.03, 100.05, 100.06, 100.08, 100.1, 296/164, 100.01
See application file for complete search history.

(56) References Cited

U.S. PATENT DOCUMENTS

| | | | | |
|---|---|---|---|---|
| 3,319,994 | A | * | 5/1967 | Smock ................ 296/100.1 |
| 3,578,378 | A | | 5/1971 | Anderson |
| 3,923,334 | A | | 12/1975 | Key |
| 3,954,296 | A | | 5/1976 | Patnode |
| 3,995,890 | A | * | 12/1976 | Fletcher ................ 296/100.1 |
| 4,101,162 | A | | 7/1978 | Koehn |
| 4,277,098 | A | | 7/1981 | Gibney |
| 4,420,181 | A | | 12/1983 | Hallburg |
| 4,613,181 | A | * | 9/1986 | Rafi-Zadeh ............ 296/100.08 |
| 4,673,209 | A | * | 6/1987 | Rafi-Zadeh ............ 296/100.08 |
| 4,756,571 | A | * | 7/1988 | Lake .................... 296/100.1 |
| 4,768,824 | A | | 9/1988 | Andonian |
| 4,819,981 | A | | 4/1989 | Moe et al. |
| 4,856,841 | A | * | 8/1989 | Rafi-Zadeh ............ 296/100.08 |
| 4,982,971 | A | | 1/1991 | Marin |
| 5,102,185 | A | | 4/1992 | Lake |
| 5,322,336 | A | * | 6/1994 | Isler .................... 296/100.1 |
| 5,364,154 | A | * | 11/1994 | Kaiser .................. 296/100.08 |
| 5,366,266 | A | * | 11/1994 | Harbison .............. 296/100.02 |
| 5,403,061 | A | | 4/1995 | Micknowicz |
| 5,503,450 | A | | 4/1996 | Miller |
| 5,704,681 | A | | 1/1998 | Lambden |
| 5,909,921 | A | | 6/1999 | Nesbeth |
| 5,971,446 | A | | 10/1999 | Lunney, II |
| 5,988,728 | A | | 11/1999 | Lund et al. |
| 6,042,173 | A | | 3/2000 | Nett |
| 6,042,175 | A | | 3/2000 | Williams |
| 6,186,580 | B1 | | 2/2001 | Nothem et al. |
| 6,505,875 | B1 | | 1/2003 | Laper |
| 6,623,062 | B1 | | 9/2003 | Hoffman |
| 6,749,249 | B1 | | 6/2004 | Lang |
| 6,764,125 | B2 | | 7/2004 | Bacon |
| 6,796,263 | B2 | | 9/2004 | Meyer |
| 6,814,387 | B2 | | 11/2004 | Lake |
| 6,830,281 | B2 | | 12/2004 | Hoffman |
| 7,226,108 | B2 | * | 6/2007 | Altman ................. 296/100.02 |
| 7,275,779 | B2 | | 10/2007 | Hebron |
| 7,806,457 | B2 | * | 10/2010 | Bankert ................ 296/100.05 |

(Continued)

*Primary Examiner* — Lori Lyjak
(74) *Attorney, Agent, or Firm* — Fredrikson & Byron, P.A.

(57) ABSTRACT

The invention includes a lift system for lifting a topper relative to a pickup truck box. The system is configured to lift the topper in a translational manner, such that the topper does not pivot with respect to the pickup box.

22 Claims, 9 Drawing Sheets

U.S. PATENT DOCUMENTS

| | | | |
|---|---|---|---|
| 7,959,200 B2* | 6/2011 | Voglmayr | 296/100.05 |
| 2001/0038225 A1 | 11/2001 | Muirhead | |
| 2002/0005651 A1 | 1/2002 | Young et al. | |
| 2004/0084928 A1 | 5/2004 | Bacon | |

* cited by examiner

TOPPER LIFT SYSTEM AND METHOD

RELATED APPLICATIONS

This application claims the benefit of U.S. Provisional Application Ser. No. 61/270,177, filed Jul. 6, 2009, the entire contents of which are hereby incorporated by reference.

FIELD OF THE INVENTION

This application relates to lift systems for toppers.

BACKGROUND

Pickup trucks with toppers are useful for providing security and weather protection for items being transported or stored in the pickup truck. Generally, toppers sit against an upper perimeter of a pickup box and are attached to the pickup box with clamps. The clamps are time consuming to attach and remove. In addition, most toppers weigh several hundred pounds and are difficult to manually lift on and off a pickup box. Accordingly, most toppers, after an initial installation, are seldom removed except in special circumstances.

Toppers generally have a door aligned with the rear of the pickup truck. Generally the door is upwardly pivotable while a tailgate on the pickup is downwardly pivotable. When both the door and the tailgate are opened an opening is provided for loading objects into, and removing objects from, the protective interior cavity defined by the topper and pickup box. In most toppers, the door is not as large as the entire rear wall of the topper. Accordingly, certain objects cannot be loaded into the cavity because the opening is too small, even though such objects would fit in the cavity itself.

Previous attempts to provide topper lifts have included systems that pivotably lift three sides of the topper relative to the pickup box. The fourth side of the topper is hingedly connected to the pickup box. Generally this pivot has been provided along one of the long sides of the topper rather than the front or back. The vast majority of these types of lifts are provided to lift "caps" having minimal or no sidewalls. These caps essentially provide a roof that sits on top of the pickup box. The generally planar configuration of these caps makes them easier to pivot because there are no extended sidewalls to generate extreme torques about the pivotable edge. These torques could easily deform the topper and/or shatter any windows provided by the topper. Further, in an effort to avoid these torques, when these types of pivotable systems have been provided for toppers having extended sidewalls they generally do not pivot the topper to a full vertical position (i.e., they pivot the topper less than 90 degrees upward from horizontal), or they require a stabilizer bar extending across a portion of the cargo area. Accordingly, these pivotable systems, while providing some increased access to the pickup box, are unsatisfactory because they do not provide full access from the rear of the truck, obstruct a portion of the cargo area, and/or are not stable enough to be transported in the open configuration.

SUMMARY OF THE DISCLOSURE

Embodiments of the invention provide a pickup topper lift system that lifts a topper relative to a pickup in a translational manner. Accordingly, a horizontal plane defined by a bottom perimeter edge of the topper is always generally parallel to a horizontal plane defined by an upper perimeter edge of the pickup box, regardless of the vertical position of the topper relative to the pickup box. Hence, these planes are parallel when the topper is in its fully down position when the topper is in apposition to the pickup box. These planes are also parallel with the topper is in its fully up position. Further, these planes are parallel for the entire range of travel between the fully down and fully up positions.

In embodiments of the invention, the topper can be easily moved to any of the positions along a range of travel provided by the system. A power source with a switch is provided to selectively apply lifting forces to the topper to translationally lift it relative to the pickup box. Accordingly, when a user wants to raise or lower the topper relative to the pickup, the user merely operates a switch.

Such topper lift systems provide a variety of advantages. For example, they allow for easy loading of a pickup when the topper is in an up position. Embodiments provide access to the pickup box from three sides (access to a fourth side being obstructed by the pickup cab). Further, embodiments allow for an easy way to effectively increase the size of the rear opening defined by an upwardly pivotable door and a tailgate. Accordingly, objects that fit within the interior cavity of the topper, but not through the standard opening, can be loaded into the truck when the topper is in an up position. The topper can then be lowered to a down position to securely transport the object and protect it from the weather.

DETAILED DESCRIPTION OF ILLUSTRATIVE EMBODIMENTS

Figure 1:
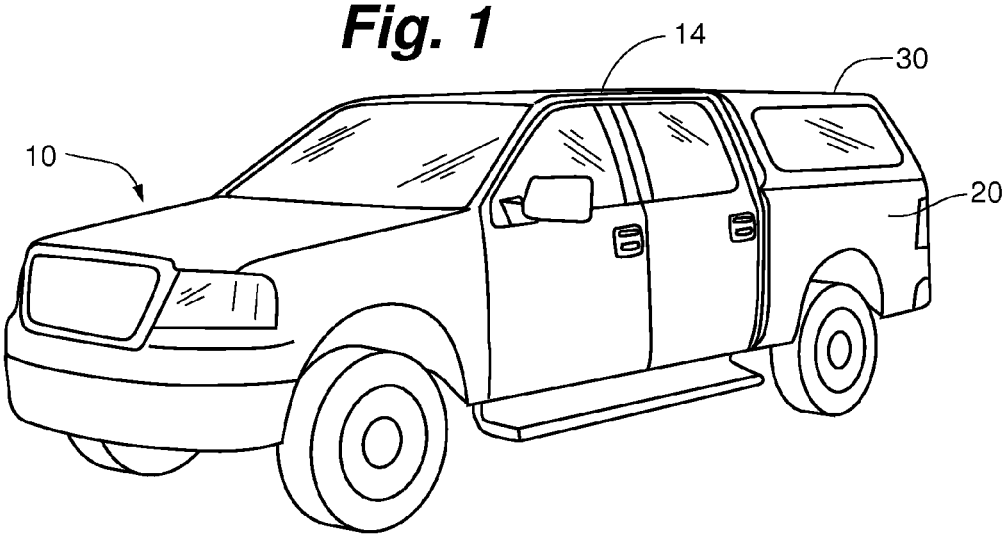
FIG. 1 includes a perspective view of a truck with a topper in accordance with an embodiment of the invention.

The following detailed description is to be read with reference to the drawings. The drawings, which are not necessarily to scale, depict selected embodiments, but are not intended to limit the scope of the invention. It will be understood that many of the specific details of the system illustrated in the drawings could be changed or modified by one of ordinary skill in the art without departing significantly from the spirit of the invention. Note that references to "up," "down," "above," "below" and the like will refer to the position of the described system when it is installed as shown in the Figures.

Figure 2:
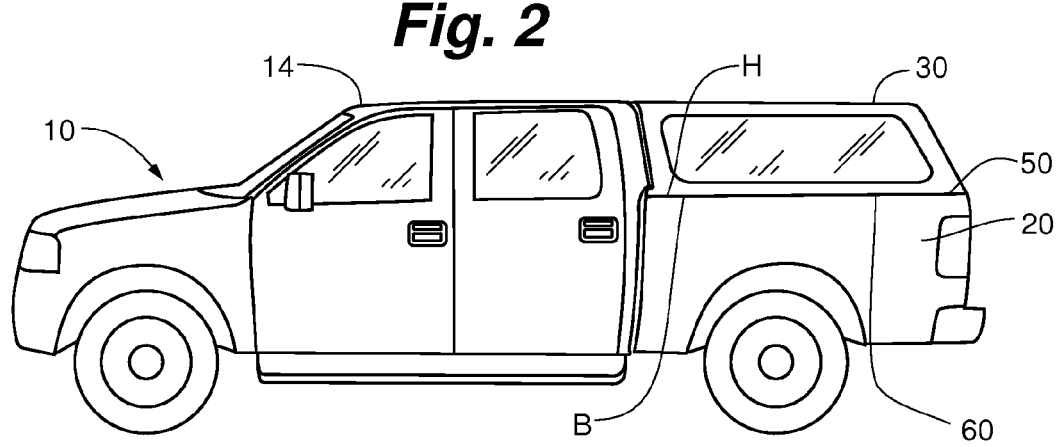
FIG. 2 includes a side plan view of a truck with a topper in a down configuration in accordance with an embodiment of the invention.

Embodiments of the invention include a lift system for lifting a topper toward and away from a pickup truck box. FIG. 1 provides a perspective view of a pickup truck (sometimes referred to herein as a truck) 10 having a cab 14 and box 20. As shown in FIG. 1, a topper 30 can be provided to cover the box 20. FIG. 2 provides a side plan view of the truck 10 with a topper 30 on its box 20. Embodiments of the invention provide a system 40 and method for lifting the topper 30 above the box 20. The various components of system 40 will be discussed further below.

Topper 30 rests on box 20 when the topper is in its most downward position. The topper includes a bottom perimeter edge 50, first, second, third, and fourth walls extending upward from the bottom perimeter, a pivotable door included in at least one of the walls, and a roof in a plane generally parallel to a plane defined by the bottom perimeter. The first, second, third, and fourth walls and roof form a cavity for carrying cargo. Toppers are generally formed of fiberglass or metal and are generally rigid. Pickup box 20 includes a floor in a generally horizontal plane, first, second, third, and fourth walls (one of which includes a pivotable tailgate) extending upward from the floor, and an upper perimeter edge 60 defined by the top edges of the first, second, third, and fourth walls. The floor and first, second, third, and fourth walls define a cavity for transporting cargo.

Figure 3:
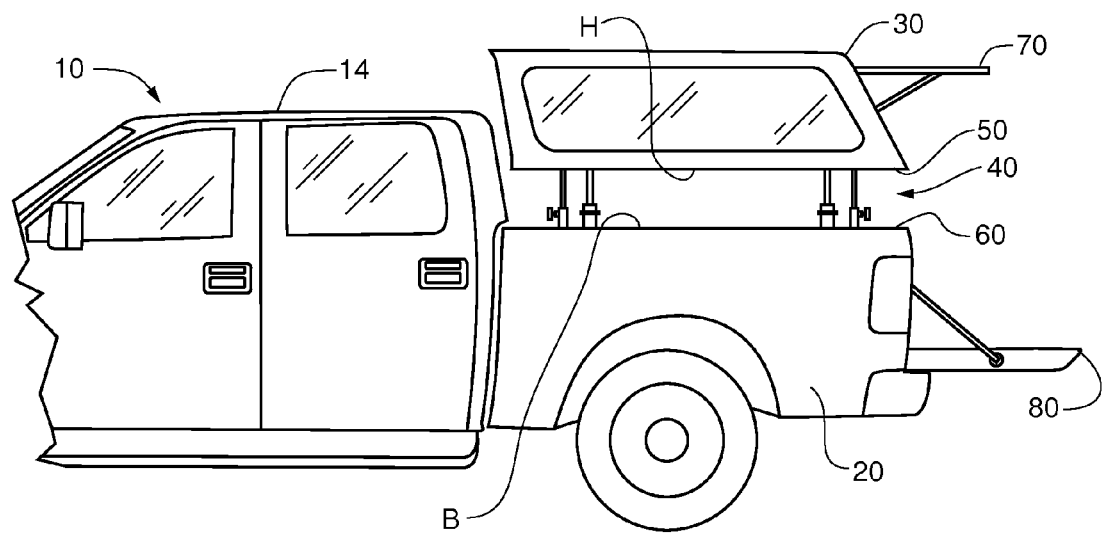
FIG. 3 includes a side plan view of a truck with a topper in an intermediate configuration in accordance with an embodiment of the invention.
Figure 4:
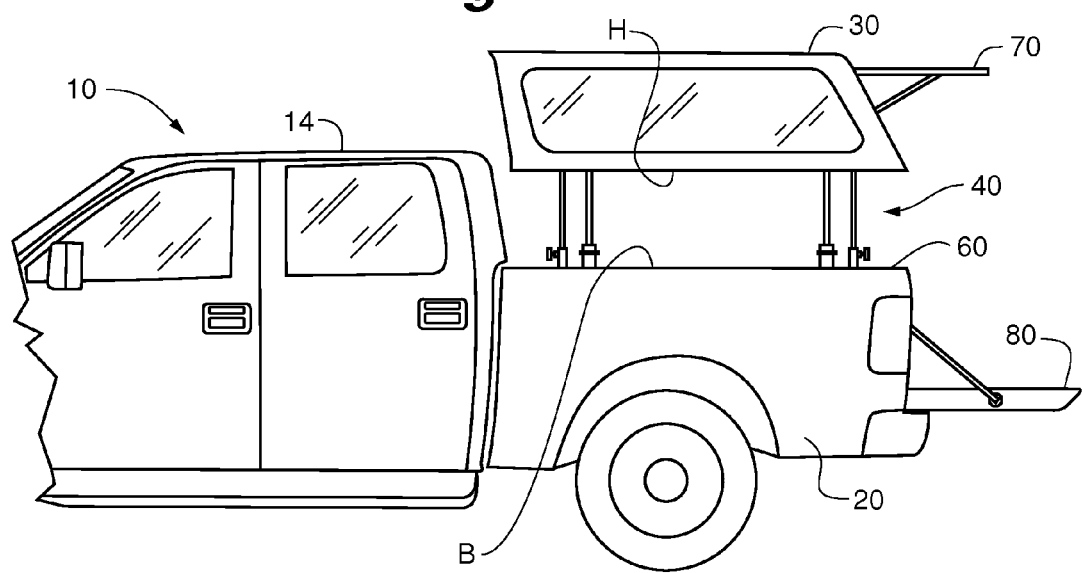
FIG. 4 includes a side plan view of a truck with a topper in a fully up configuration in accordance with an embodiment of the invention.
Figure 5:
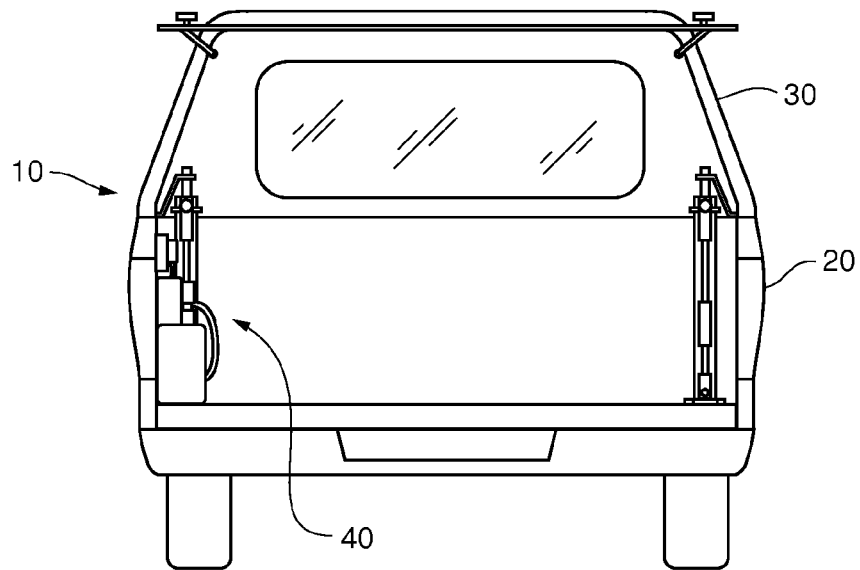
FIG. 5 includes a rear plan view of a truck with a topper in a down configuration in accordance with an embodiment of the invention.
Figure 6:
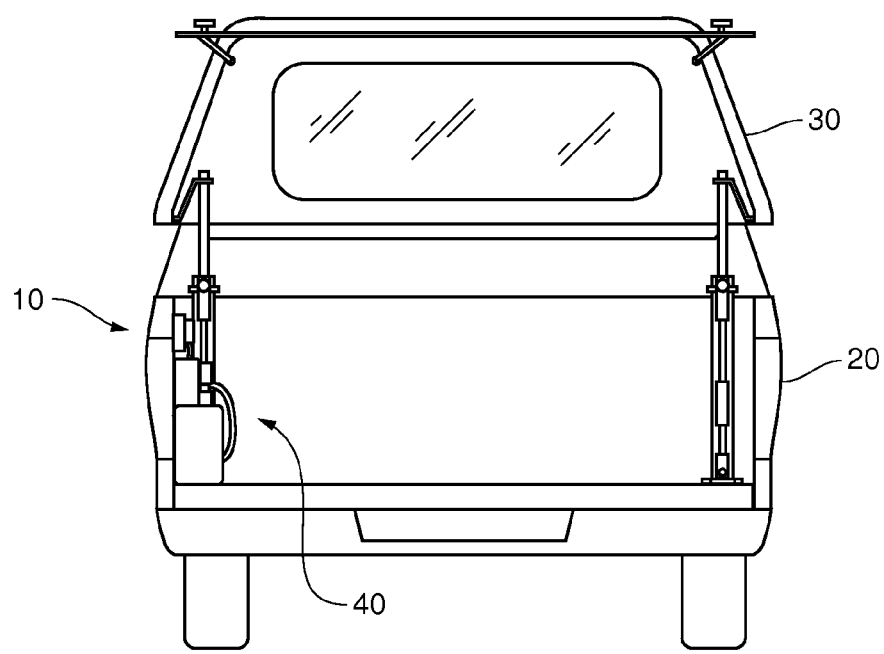
FIG. 6 includes a rear plan view of a truck with a topper in an intermediate configuration in accordance with an embodiment of the invention.
Figure 7:
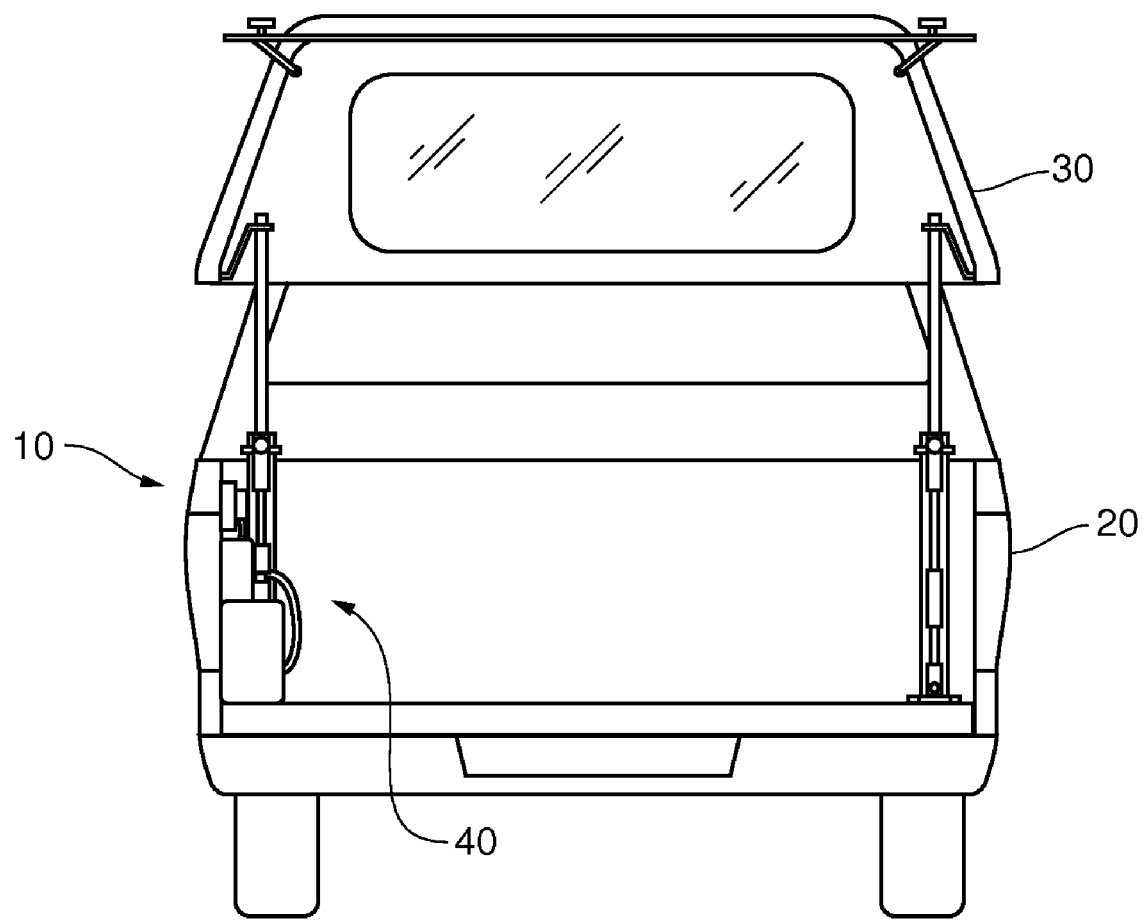
FIG. 7 includes a rear plan view of a truck with a topper in a fully up configuration in accordance with an embodiment of the invention.

FIG. 3 shows the topper 30 being lifted above the box 20 by the system 40. In FIG. 3, the topper 30 is lifted to an intermediate vertical position. That is, the vertical position of the topper 30 in FIG. 3 is neither at its lowest most possible position nor its highest most possible position. Rather, it is depicted at one of an infinite number of available vertical positions between its lowest possible position and its highest possible position. FIG. 4 provides a side plan view of the truck 10 with the topper 30 at its highest position. Note that in the embodiment shown in FIG. 4 the bottom of the topper is at about the same height as the top of the cab 14. However, the invention is not so limited and the system 40 may be configured to raise a topper more or less than the height depicted in FIG. 4. In some embodiments, the range of travel is greater than about 12 inches. In other embodiments, the range of travel is greater than about 18 inches. FIGS. 5-7 provide rear plan views of the truck 10 with the topper 30 depicted in its lowest most position, an intermediate position, and its highest position relative to the box 20, respectively.

It should be noted that in comparing FIGS. 2, 3, and 4 that the system 40 lifts the topper 30 in a translational manner relative to the box 20. That is, a horizontal plane H defining the bottom perimeter edge 50 of the topper 30 remains generally parallel with a horizontal plane B defining the top perimeter edge 60 of the box 20 throughout the entire range of travel. Accordingly, the topper 30 does not pivot with respect to the box 20 as its vertical location is changed.

Such a system 40 provides a variety of advantages. For example, it allows for easy loading of a pickup 10 when the topper 30 is in an up position. Embodiments provide access to the pickup box 20 from three sides (access to a fourth side being obstructed by the pickup cab). Further, embodiments allow for an easy way to effectively increase the size of the rear opening defined by an upwardly pivotable door 70 and the tailgate 80. Accordingly, objects that fit within an interior cavity of the topper 30 and box 20, but not through the opening, can be loaded into the truck 10 when the topper 30 is in an up position. The topper 30 can then be lowered to a down position to securely transport the object and protect it from the weather. As just one example, all-terrain vehicles (ATVs) typically do not fit through the opening provided by a topper pivotable door and a tailgate. Therefore, most pickups with toppers transport ATVs with a trailer. However, ATVs typically do fit within the interior cavity defined by the topper and the pickup box. Embodiments of the invention allow for the ATV to be transported within the topper without the user having to remove and reinstall the topper to load the ATV. In turn, embodiments of the invention eliminate the need for a trailer, with their associated negative fuel economy effects, to transport objects such as ATVs.

Figure 8:
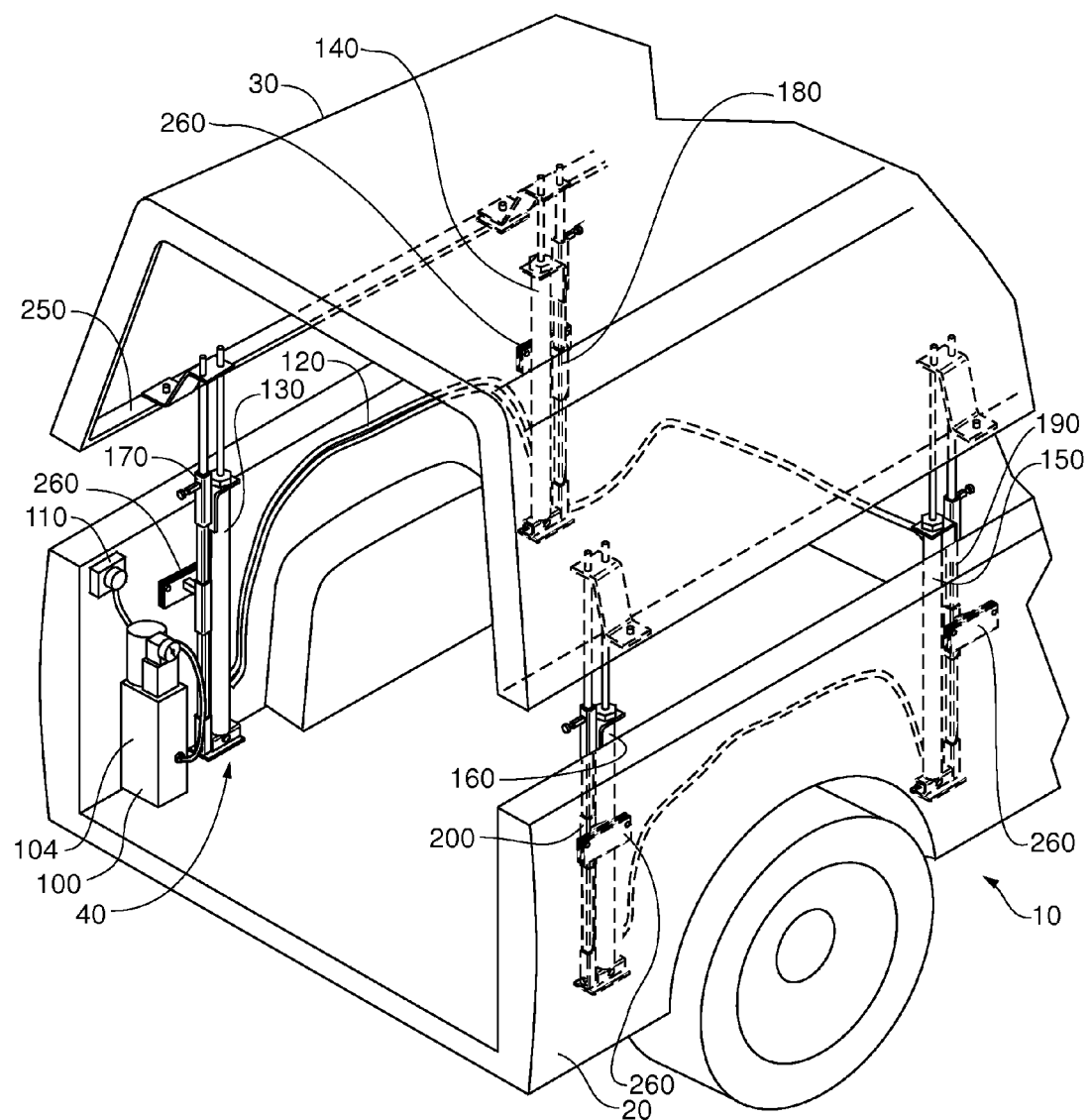
FIG. 8 includes a perspective view of the lift system in accordance with an embodiment of the invention.

An embodiment of the lift system 40 is shown in FIG. 8. As shown, embodiments of the invention include a power source 100. The power source 100, in this embodiment, includes an electric motor coupled to a pneumatic pump. The motor is connected to the truck's electrical system and draws current from the truck's battery. In some embodiments, the electric motor runs on 12 volt direct current with a maximum power draw of 14.5 Amperes, and the pneumatic pump has a maximum pressure of 130 PSI. The pressure required to raise the topper will depend on the topper's weight, but will generally be between about 20 PSI and 80 PSI. In some embodiments, the pneumatic pump includes an auxiliary hose connection, such that the pump can also be used to inflate items not associated with the topper lift system, such as tires.

A power switch (not depicted) can be provided for selectively turning the motor on and off. A directional switch 110 is also shown in FIG. 8. Directional switch 110 is useful for selectively causing the topper to ascend or descend when the power switch is on. It should be noted that directional switch can be provided in a same housing 104 as the power source 100, and/or combined with the power switch. The housing 104 may be secured (e.g., bolted) to the interior of the pickup box, or it may be secured to one of the brackets of the system 40, which are discussed further below. In either case, it is desirable the housing 104 be secure such that it does not move relative to the box 20. In some embodiments, the power switch and/or the directional switch are included in a remote control in radio communication with the power source.

As shown, the power source 100 is connected via hose(s) 120 to first, second, third, and fourth, lifting elements 130, 140, 150, 160, respectively. In the embodiment shown, each lifting element is provided proximate a corner of the pickup box 20. In embodiments where the power source 100 includes a pneumatic pump, the lifting elements can include air rams. In such an arrangement, compressed air from the pump is provided to each air ram via the hose(s) to supply each ram with compressed air to cause it to expand and lift the topper. Because the system 40 lifts the topper 30 in a translational manner, each air ram expands at approximately the same rate when it is supplied with compressed air. Accordingly, the first, second, third, and fourth lifting elements will typically be identical to each other. Also as shown in the embodiments of FIG. 8, first, second, third, and fourth lifting elements 130, 140, 150, and 160 are associated with first, second, third, and fourth brackets 170, 180, 190, and 200, respectively. In such embodiments, a bracket is provided proximate each corner of the pickup box 20, and each bracket connects to the box 20 and the topper 30.

Figure 9:
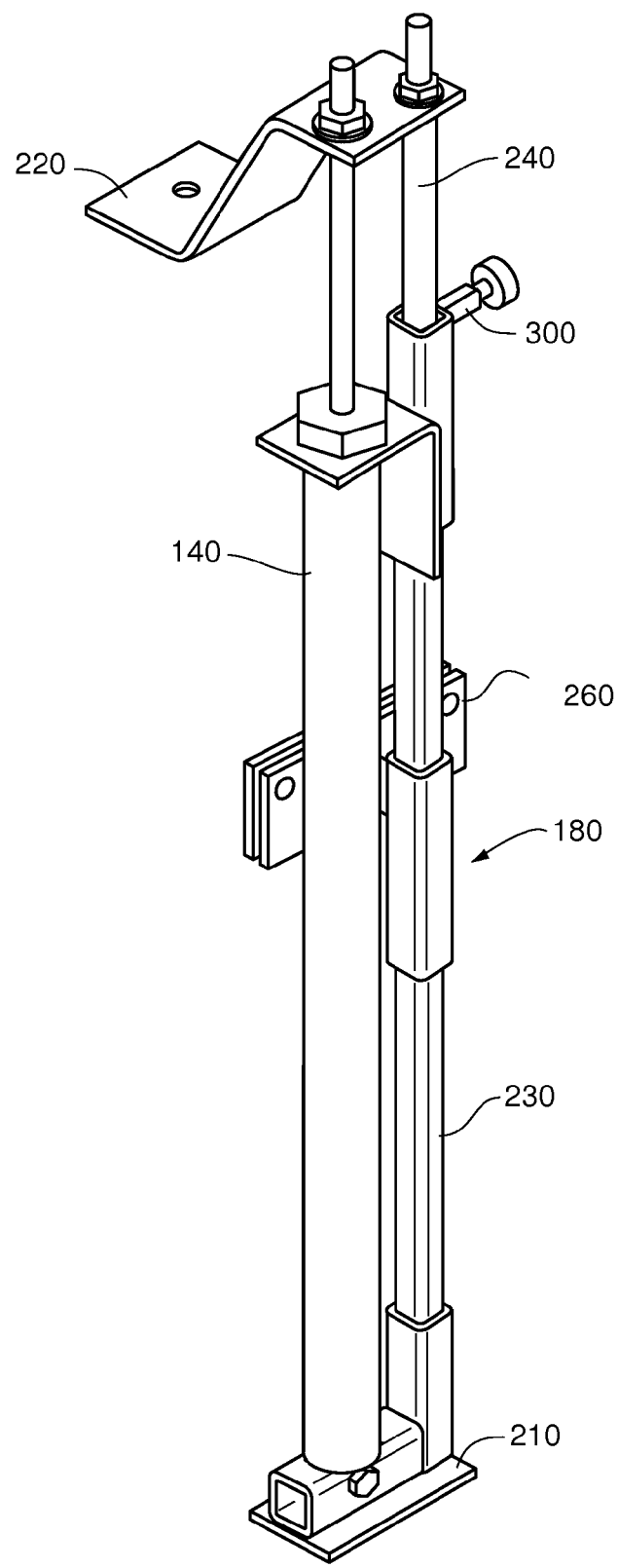
FIG. 9 includes a perspective view of a bracket and lifting element in accordance with an embodiment of the invention.
Figure 10:
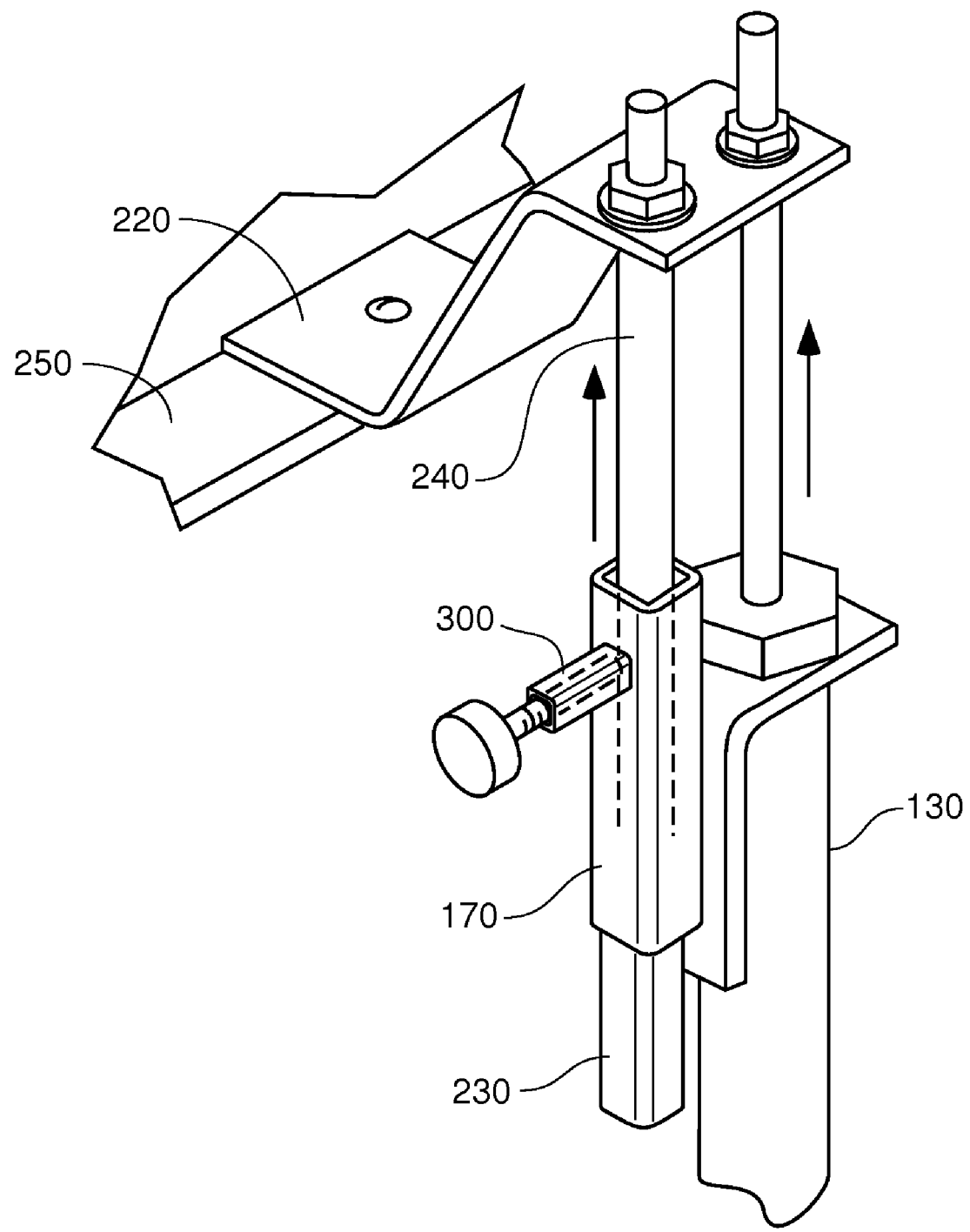
FIG. 10 includes a partial perspective view of a bracket and lifting element in accordance with an embodiment of the invention.
Figure 11:
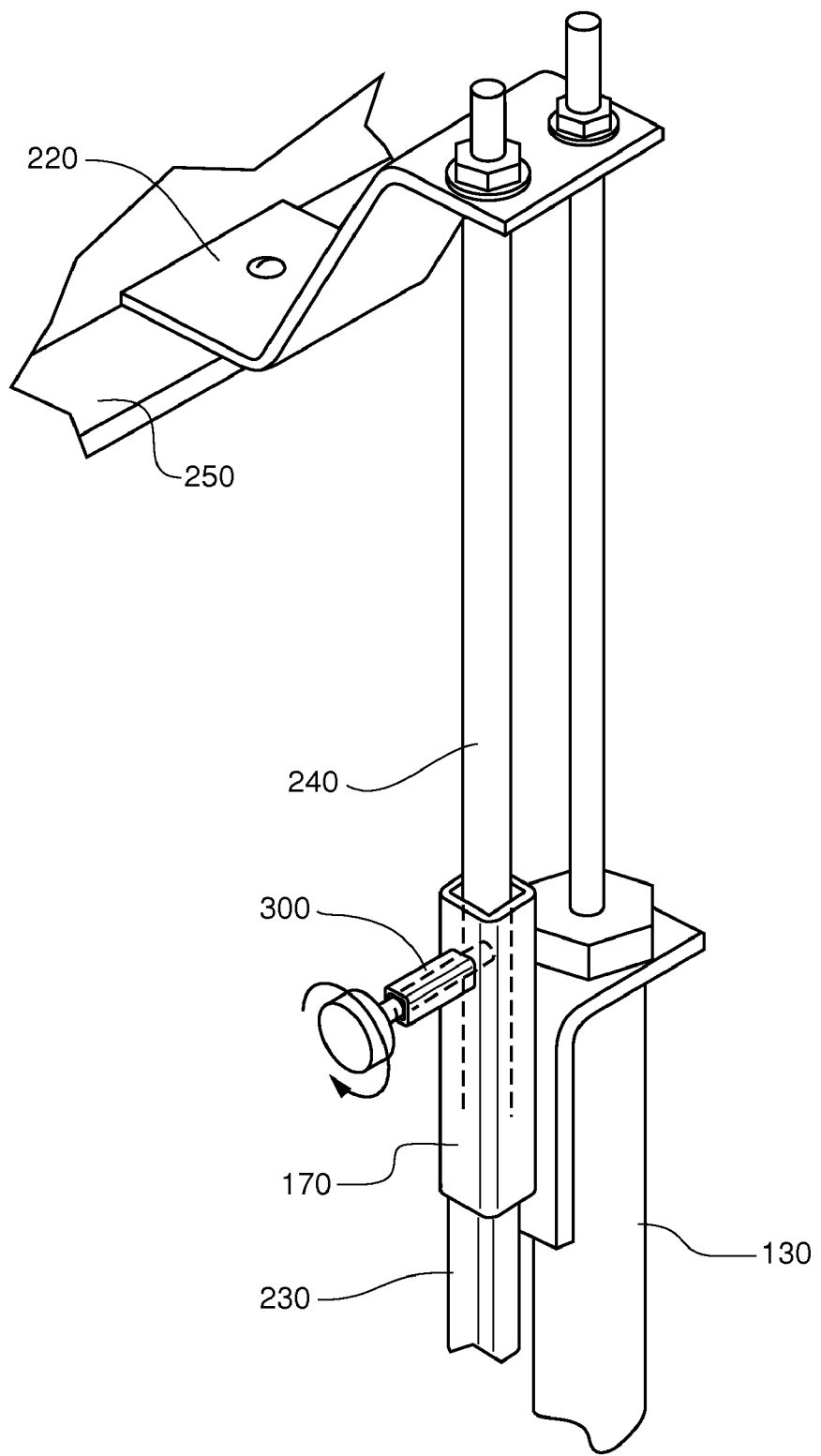
FIG. 11 includes a partial perspective view of a bracket and lifting element in accordance with an embodiment of the invention highlighting a lock in accordance with an embodiment of the invention.

A perspective view of a representative bracket is shown in FIG. 9. As shown, the bracket 180 includes a first flange 210 adapted to attach to a pickup and a second flange 220 adapted to attach to the topper. In the embodiment shown, the first flange 210 is coupled to a first portion 230 of the bracket, and the second flange 220 is coupled to a second portion 240 of the bracket. Second portion 240 is at least partially received within first portion 240 such that the bracket is allowed to expand and contract. FIG. 10 shows a bracket in a relatively contracted position, and FIG. 11 shows a bracket in a relatively expanded configuration. As shown in FIGS. 9-11, in some embodiments the lifting element 140 is also coupled to the second flange 220 and its expansion and contraction is what causes the first portion of the bracket to move relative to the second portion of the bracket.

First flange 210 and second flange 220 can include any useful shape. In some embodiments, first flange 210 is generally planer and is adapted to rest on, and be bolted to, the pickup box in a generally horizontal plane. As shown in FIG. 8, second flange 220 may be provided with one or more bends that allow it to be easily attached to a top surface of a lip 250 of the topper 30. In such an arrangement, the second flange rests in apposition to the top surface of the lip 250 after installation, such that the bottom surface of the lip 250 can rest in apposition to the top perimeter of the box 20 when the topper is in the down position without the second flange being between them.

As shown in FIGS. 8 and 9, some embodiments of the bracket include a third flange 260. Third flange 260 is adapted to provide additional stability to the bracket. In some embodiments, third flange 260 is adapted to rest against a side of a pickup box in a plane generally transverse to the horizontal plane defined by the first flange 210. Further, third flange may extend outward of first portion 230 to provide an extended "T" configuration.

As shown in FIGS. 9-11, some embodiments of the bracket include a lock 300 to selectively lock the position of the first portion 230 relative to the second portion 240 regardless of whether or not the power source is on. Such embodiments are particularly useful for locking the topper in an upward position to increase the effective size of the opening and the cavity defined by the topper and pickup box. In some embodiments, the system 40 allows the pickup to be driven when the brackets are locked in an up position to allow large objects to be transported. The lock itself can be any mechanism useful for arresting relative movement between the first and second portions. As shown best in FIG. 11, the lock can include a set screw carried by the first portion that, when turned by a user, binds against the second portion 240. In some embodiments, the lock 300 is only provided to lock the topper in an upward position and is not required to be actuated to keep the topper in the down position, even while the truck is moving.

In some embodiments, the brackets are adapted to reduce binding between the first and second portions. For example, a sleeve may be provided around the second portion, the sleeve acting to reduce friction and binding forces between the first and second portions. In embodiments where the first and second portions primarily comprise metal (e.g., steel) the sleeve can comprise a polymer such as Nylon.

Figure 12:
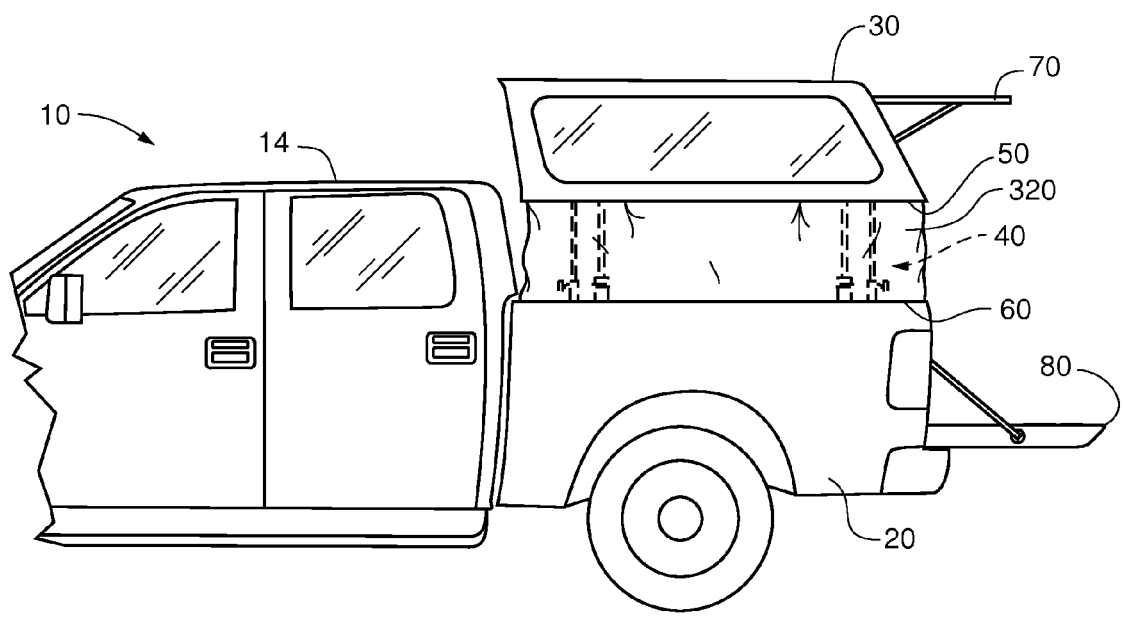
FIG. 12 includes a side plan view of a truck with a topper in a fully up configuration including a sheet of material in accordance with an embodiment of the invention.

As shown in FIG. 12, one or more sheets 320 can be provided to enclose the space between the bottom lip of the topper and the top perimeter edge of the box 20 when the topper 30 is in an up position. FIG. 12 shows the sheet on one side, but the sheet (or sheets) may extend around the entire perimeter edge to fully enclose the space. The sheet may be attachable proximate the bottom perimeter edge 50 of the topper and the top perimeter edge 60 of the pickup box, and can fold inward when the topper is in a down position and unfold as the topper is raised. The sheet itself can comprise any material, such as canvas. Such a sheet is useful for allowing the topper to be used as a camper when it is in its raised position.

Although the description above mainly describes lift systems having a pneumatic pump and pneumatic cylinders to raise and lower the topper, the invention is not so limited. Alternative systems include screw jacks. In such embodiments, a screw jack may be provided proximate each corner of a pickup box, and an electric motor for rotating the screw jack can be provided. A power system to direct power to each motor can be provided. During operation, a user can actuate to power source to cause the screw jacks to raise or lower to raise or lower the topper relative to the pickup. Such a system may be useful in heavy duty applications, or to raise an extremely heavy or large topper. Other alternative embodiments include the use of hydraulic cylinders. This type of system is similar to the screw jack embodiment described above, except hydraulic cylinders are provided in place of the screw jacks. Yet other alternative embodiments utilize a scissor-style bracket system.

Embodiments of the invention also include a lift system provided in the form of a prepackaged kit for installation on a pickup with a topper. In some embodiments, the kit can include a power source, related switches (e.g., power and directional switching), at least two (e.g., four) brackets, and at least one (e.g., four) lifting elements, along with related installation hardware such as bolts, washers, and nuts, and assembly instructions. In embodiments of the system having an auxiliary air hose connection, an auxiliary air hose can also be supplied with the kit. Such kits can be used to supply a lift assembly 40 to a pickup to provide translational lifting of a topper relative to the truck.

Embodiments of the invention also include methods of using any of the embodiments of the lift systems described above. In some embodiments, the method includes the steps of powering on a power system to draw power from a pickup, actuating a switch to cause the topper to translationally move relative to the pickup in a first direction (e.g., upward), actuating the switch to cause the topper to translationally move relative to the pickup in a second direction opposite direction as the first direction (e.g., downward). In such embodiments the generally horizontal plane H defined by the lower perimeter edge 50 of the topper 30 is generally parallel to the horizontal plane B defined by the top perimeter edge 60 of the pickup box 20 throughout the range of travel of the topper.

While embodiments of the present invention have been described, it should be understood that various changes, adaptations, and modifications may be made therein without departing from the spirit of the invention and the scope of the appended claims.

What is claimed is:

1. A lift system for lifting a topper, comprising:
   a power source;
   at least one bracket for attaching the topper to a pickup, the bracket having a first flange adapted to attach to a pickup box and a second flange adapted to attach to a topper, the bracket allowing the first and second flanges to move relative to each other; and
   a lifting element adapted to convert power provided by the power source to a lift force to lift the topper relative to the pickup box, wherein the bracket and lifting element are configured to translationally lift the topper relative to the pickup box, such that a generally horizontal plane defined by a bottom perimeter edge of the topper remains generally parallel to a generally horizontal plane defined by a top perimeter edge of the pickup box throughout a range of travel allowed by the lift system.

2. The lift system of claim 1, wherein the bracket includes a third flange adapted to rest against a side of the pickup box.

3. The lift system of claim 1, wherein the power source connects to a power system of the pickup to draw power from the pickup.

4. The lift system of claim 1, wherein the power source drives a pneumatic pump and the lifting element includes a pneumatic air ram associated with the bracket.

5. The lift system of claim 1, wherein the power system includes an on/off switch to selectively start and stop an electric motor, and a directional switch to raise or lower the topper.

6. The lift system of claim 1, wherein the system includes a lock for selectively locking the location of the first flange relative to the second flange at a desired position.

7. The lift system of claim 6, the lock including a set screw.

8. The lift system of claim 1, wherein the second flange, when installed, is in apposition to an upper surface of a perimeter lip of the topper.

9. The lift system of claim 1, the system further including a sheet of material attachable proximate the bottom perimeter edge of the topper and the top perimeter edge of the pickup box, the material folding when the topper is in a down position and unfolding when the topper is in an up position.

10. The lift system of claim 1, the bracket including a sleeve to reduce friction and binding forces.

11. The lift system of claim 10, wherein the sleeve includes nylon.

12. A lift system for lifting a topper, comprising:
a power source including an electric motor and a switch;
first, second, third, and fourth brackets, each bracket having a first portion with a first flange adapted to rest on a pickup box in a generally horizontal plane and a second flange adapted to attach to a topper, the bracket allowing for relative movement between the first portion and the second portion; and
first, second, third, and fourth lifting elements associated with the first, second, third, and fourth brackets, respectively, the brackets and lifting elements being arranged to translationally lift the topper relative to the pickup box, such that a generally horizontal plane defined by a bottom perimeter edge of the topper remains generally parallel to a generally horizontal plane defined by a top perimeter edge of the pickup box throughout a range of travel allowed by the lift system.

13. The lift system of claim 12, wherein each bracket includes a third flange adapted to rest against a side of the pickup box.

14. The lift system of claim 12, wherein the power source connects to a power system of the pickup to draw power from the pickup.

15. The lift system of claim 12, wherein the power source drives a pneumatic pump and the first, second, third, and fourth lifting elements include first, second, third, and fourth pneumatic air rams, respectively, each associated with the first, second, third, and fourth brackets, respectively.

16. The lift system of claim 12, wherein the power system includes an on/off switch to selectively start and stop an electric motor, and a directional switch to raise or lower the topper.

17. The lift system of claim 12, wherein the system includes a lock for selectively locking the location of the first portion relative to the second portion at a desired position.

18. The lift system of claim 17, the lock including a set screw adapted to create binding forces against the second portion.

19. The lift system of claim 12, wherein the second flange, when installed, is in apposition to an upper surface of a perimeter lip of the topper.

20. The lift system of claim 12, the system further including a sheet of material attachable proximate the bottom perimeter edge of the topper and the top perimeter edge of the pickup box, the material folding when the topper is in a down position and unfolding when the topper is in an up position.

21. The lift system of claim 12, further including a sleeve around the second portion, the sleeve acting to reduce friction and binding forces between the first and second portions.

22. The lift system of claim 21, wherein the sleeve includes nylon.

* * * * *